US011444290B2

(12) United States Patent
Kim et al.

(10) Patent No.: US 11,444,290 B2
(45) Date of Patent: Sep. 13, 2022

(54) SEPARATOR, AND FUEL CELL STACK COMPRISING THE SAME

(71) Applicant: LG CHEM, LTD., Seoul (KR)

(72) Inventors: Yoo Seok Kim, Daejeon (KR); Hye Mi Jung, Daejeon (KR); Chang Sun Kong, Daejeon (KR); Jae Choon Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 2 days.

(21) Appl. No.: 16/483,498

(22) PCT Filed: Feb. 9, 2018

(86) PCT No.: PCT/KR2018/001738
§ 371 (c)(1),
(2) Date: Aug. 5, 2019

(87) PCT Pub. No.: WO2018/147669
PCT Pub. Date: Aug. 16, 2018

(65) Prior Publication Data
US 2020/0112034 A1    Apr. 9, 2020

(30) Foreign Application Priority Data

Feb. 10, 2017   (KR) .................... 10-2017-0018631

(51) Int. Cl.
*H01M 8/0232*    (2016.01)
*H01M 8/241*    (2016.01)
*H01M 8/10*    (2016.01)

(52) U.S. Cl.
CPC ......... *H01M 8/0232* (2013.01); *H01M 8/241* (2013.01); *H01M 2008/1095* (2013.01)

(58) Field of Classification Search
CPC .................................................. H01M 8/0232
See application file for complete search history.

(56) References Cited

U.S. PATENT DOCUMENTS

| 2005/0069747 | A1  | 3/2005 | Anaf et al. |
| 2006/0105222 | A1  | 5/2006 | Abd Elhamid et al. |
| 2007/0212538 | A1* | 9/2007 | Niu ...................... H01M 4/8657 |
| | | | 428/367 |

(Continued)

FOREIGN PATENT DOCUMENTS

| JP | 2001514785 |  | 9/2001 |
| JP | 2007207719 | A | 8/2007 |
| JP | 2007242417 |  | 9/2007 |

(Continued)

OTHER PUBLICATIONS

Extended European Search Report corresponding to EP 18751540, dated Dec. 16, 2019 (9 pp).

(Continued)

*Primary Examiner* — Ula C Ruddock
*Assistant Examiner* — Thomas H. Parsons
(74) *Attorney, Agent, or Firm* — Myers Bigel, P.A.

(57) ABSTRACT

The present invention relates to a separator, and a fuel cell stack comprising the same, and according to one aspect of the present invention, there is provided a separator formed of a metallic material and having a plurality of pores, wherein some regions have a hydrophilic surface and some other regions have a hydrophobic surface.

16 Claims, 2 Drawing Sheets

(56) References Cited

U.S. PATENT DOCUMENTS

2009/0136789 A1    5/2009  Pien et al.
2012/0107722 A1    5/2012  Satake et al.

FOREIGN PATENT DOCUMENTS

| JP | 2008176971 | * | 7/2008 |
| JP | 2008176971 A | * | 7/2008 |
| JP | 2009211953 | * | 9/2009 |
| JP | 2009211953 A | * | 9/2009 |
| JP | 5389767 | | 1/2014 |
| KR | 1020100119230 | | 11/2010 |
| KR | 20110062360 | * | 6/2011 |
| KR | 20110062360 A | * | 6/2011 |
| KR | 20110064807 | * | 6/2011 |
| KR | 1020110064807 | | 6/2011 |

OTHER PUBLICATIONS

International Search Report corresponding to International Application No. PCT/KR2018/001738, dated May 21, 2018 (4 pages with English translation).

* cited by examiner

SEPARATOR, AND FUEL CELL STACK COMPRISING THE SAME

CROSS REFERENCE TO RELATED APPLICATIONS

This application is a 35 U.S.C. § 371 national stage application of PCT International Application No. PCT/KR2018/001738, filed Feb. 9, 2018, which claims priority from Korean Patent Application No. 10-2017-0018631, filed Feb. 10, 2017, the contents of which are incorporated herein in their entireties by reference. The above-referenced PCT International Application was published in the Korean language as International Publication No. WO 2018/147669 on Aug. 16, 2018.

TECHNICAL FIELD

The present invention relates to a separator and a fuel cell stack comprising the same.

BACKGROUND ART

Generally, a fuel cell is an energy conversion device that generates electrical energy through an electrochemical reaction between a fuel and an oxidizer and has an advantage that power can be consistently generated as long as the fuel is continuously supplied.

The polymer electrolyte fuel cell stack may comprise a membrane-electrode assembly (MEA) having an electrode layer formed by applying an anode and a cathode, respectively, around an electrolyte membrane composed of a polymer material, a gas diffusion layer (GDL) serving to distribute reaction gases evenly over reaction zones and to transfer electrons generated by oxidation reaction of the anode electrode toward the cathode electrode, a separating plate (bipolar plate) for supplying the reaction gases to the gas diffusion layer and discharging water generated by the electrochemical reaction to the outside, and a rubber material gasket having elasticity disposed on the outer circumference of the reaction zone of the separating plate or the membrane-electrode assembly to prevent leakage of the reaction gases and the cooling water.

The separator formed of a porous body should disperse a raw material gas (air, oxygen) well so that the raw material gas reacts with hydrogen ions to produce water well, and specifically, the separator should be capable of increasing reactivity between oxygen and hydrogen ions and discharging the produced water well.

On the other hand, when a large amount of water is generated, the water interferes with the flow of the raw material gas while being condensed in the separator, and the reaction surface between the raw material gas and the catalyst layer is reduced, resulting in low reactivity. Due to such a continuous phenomenon, a large amount of water is generated in high power operation, whereby a phenomenon such as voltage drop or power degradation occurs.

Unlike this, when the water is discharged too well and the humidity of the electrode surface is low, ion conductivity is lowered and thus the resistance of the battery is increased. Therefore, it is important that a constant humidity is maintained in the electrode and the generated water is appropriately discharged.

DISCLOSURE

Technical Problem

It is a problem to be solved by the present invention to provide a separator and a fuel cell stack that can separate a path of water and a path of a reaction gas through surface treatment.

In addition, it is another problem to be solved by the present invention to provide a separator and a fuel cell stack that can control the size of migration paths of water and a reaction gas and can maintain constant moisture.

Technical Solution

To solve the above problems, according to one aspect of the present invention, there is provided a separator formed of a metallic material and having a plurality of pores, wherein some regions have a hydrophilic surface and some other regions have a hydrophobic surface.

The separator may comprise a first metallic wire having a hydrophilic surface and a second metallic wire which is woven with the first metallic wire so as to form a predetermined size of pores and has a hydrophobic surface.

Also, the first metallic wire and the second metallic wire may be continuously woven along a first direction.

Furthermore, the intervals between weaving points along the first direction may be constant.

In addition, the intervals between weaving points along the first direction may be different.

Also, the first metallic wire and the second metallic wire may have the same diameter.

Furthermore, the first metallic wire and the second metallic wire may have different diameters.

In addition, the first and second metallic wires may have a diameter of 50 to 500 mm.

The present invention also provides a fuel cell stack comprising another membrane-electrode assembly, a gas diffusion layer disposed on one side of the membrane-electrode assembly and a separator disposed to be in contact with the gas diffusion layer at least in some regions, wherein the separator is formed of a metallic material and has a plurality of pores, and some regions have a hydrophilic surface and some other regions have a hydrophobic surface.

Advantageous Effects

As described above, the separator related to one embodiment of the present invention and the fuel cell stack comprising the same have the following effects.

According to the present invention, by weaving metallic wires having different surface properties, various structural and performant applications can be expanded.

The surface of the metallic wire can be treated in various ways (heat treatment, anodizing, plasma, etc.) to change physical properties of the metal surface.

Also, the size of a fluid (liquid, gas) can be controlled by the difference in the method of binding metallic wires (for example, 0.5 rotations, 1.5 rotations or more).

Furthermore, the thicknesses of two metallic wires to be woven are made different from each other, so that the respective fluid passages can be set differently, and the interval between weaving points is adjusted, so that the size of the pores for the vertical surface of the porous body can be controlled.

In addition, at the interface between a stagnant liquid and a flowing gas, the liquid can be dispersed or its flow can be induced by the speed difference between the two materials. These surface properties can be determined for each range according to the surface tension of the hydrophilic metallic wire, the humidity to be injected, and the flow rate of the gas.

MODE FOR INVENTION

Figure 1:
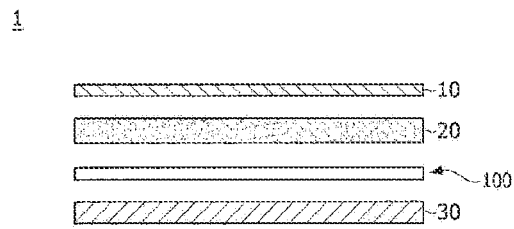
FIG. 1 is a conceptual diagram of a fuel cell stack related to one embodiment of the present invention.

Hereinafter, the separator according to one embodiment of the present invention and the fuel cell stack comprising the same will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

Figure 2:
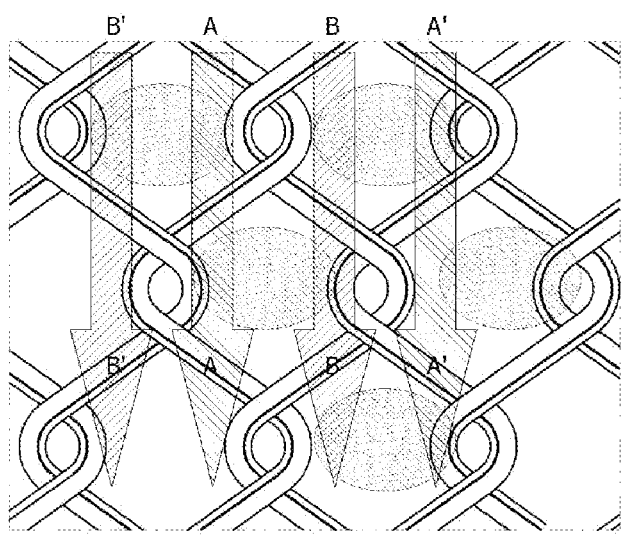
FIG. 2 is a conceptual diagram of a separator related to one embodiment of the present invention.
Figure 3:
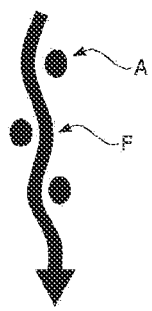
FIG. 3 is a conceptual diagram showing a fluid flow in the separator depicted in FIG. 2.
Figure 4:
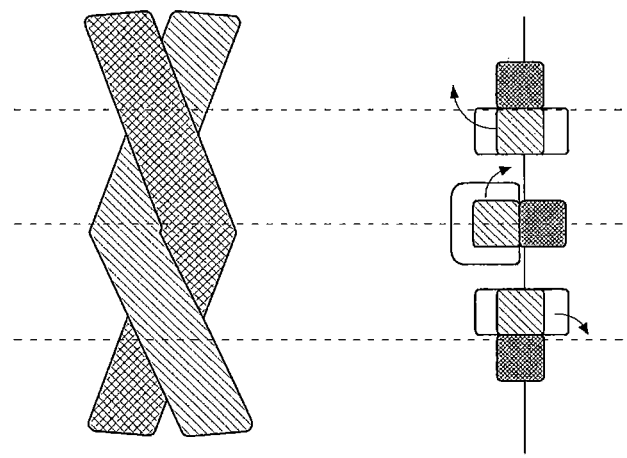
FIG. 4 is a conceptual diagram for explaining one example of a weaving method.

FIG. 1 is a conceptual diagram of a fuel cell stack (1) related to one embodiment of the present invention, FIG. 2 is a conceptual diagram of a separator (100) related to one embodiment of the present invention, and FIG. 4 is a conceptual diagram for explaining one example of a weaving method (weaving of 0.5 rotations).

Referring to FIG. 1, a fuel cell stack (1) related to one embodiment of the present invention comprises a membrane-electrode assembly (10), a gas diffusion layer (20) disposed on one side of the membrane-electrode assembly and a separator (100) disposed to be in contact with the gas diffusion layer at least in some regions. In addition, the fuel cell stack (1) comprises a plate (30) for supporting one surface of the separator (100). Here, at least some regions of the separator (100) may be attached to the plate (30), and for example, may be spot-welded. The plate (30) forms flow paths of the reaction gas and the generated water together with the separator (30).

The separator (100) is formed of a metallic material and has a plurality of pores, where some regions have a hydrophilic surface, and some other regions have a hydrophobic surface. The separator is a porous body having a plurality of pores.

Referring to FIGS. 1 and 2, the separator (100) may comprise a first metallic wire (A, A') having a hydrophilic surface and a second metallic wire (B, B') which is woven with the first metallic wire (A, A') so as to form a predetermined size of pores, and has a hydrophobic surface. The first and second metallic wires may have different surface physical properties (hydrophilicity or hydrophobicity) by various treatments. At this time, the first metallic wire and the second metallic wire may be regularly or irregularly woven along the first direction to produce a metallic mesh (porous body) having a predetermined density. In addition, two metallic wires may be woven, or three or more metallic wires may be woven to produce the separator (100).

When the porous body composed of two metallic wires is observed in detail, the hydrophilic metallic wire (first metallic wire) and the hydrophobic metallic wire (second metallic wire) intersect to be intertwined, whereby constant moisture can be maintained.

Also, at phases (weaving points) where two metallic wires intersect, the metallic wires are vertically arranged, so that upper and lower passages can be opened. In the upper and lower passages, the reaction gas can flow vertically without resistance.

That is, a certain amount of water may be adsorbed on the side of the hydrophilic metallic wire to prevent the entire humidity from being lowered, and no water may be adsorbed on the side of the hydrophobic metallic wire to prevent water more than necessary from being formed on the porous body.

Furthermore, by weaving the metallic wires, the migration path of the water and the migration path of the reaction gas can be separated.

In addition, the first metallic wire and the second metallic wire may be continuously woven along a first direction (a predetermined direction). At this time, the intervals between the weaving points along the first direction may also be constant, and the intervals between the weaving points along the first direction may be different.

Also, the first metallic wire and the second metallic wire may also have the same diameter, and the first metallic wire and the second metallic wire may have different diameters. Thus, by adjusting the diameter (thickness) of the metallic wire, the size of the migration paths of the water and the reaction gas can be adjusted.

Furthermore, the size of the fluid (liquid, gas) can be controlled by the diameter (thickness) of the metallic wire. Specifically, if the thickness of the metallic wire is too thin, the entire thickness of the separator (also referred to as a 'porous body') becomes thinner and the size of the fluid moving passage in the horizontal direction becomes narrow, so that the pressure difference between the entrance end and the discharge end becomes large. Alternatively, if the thickness of the metallic wire is too thick, the passage thickness of the porous body becomes large, whereby the deflection movement of the fluid may occur. Therefore, it is preferable that the first and second metallic wires have a diameter of 50 to 500 μm.

Referring to FIGS. 1 and 2, when a fluid (water, reaction gas) flows in the vertical direction, a liquid (moisture) or a gas having a relatively high humidity flows in the A and A' regions (first metallic wire, red arrows). In addition, since the B and B' regions (second metallic wire, blue arrows) are continuously exposed to the hydrophobic surface, a dry gas or a gas having a relatively low humidity flows.

In addition, the moisture is adsorbed on the hydrophilic surface of the first metallic wire in the A and A' regions, so that the constant humidity can be maintained as a whole. Also, in the B and B' regions, it is difficult for water to coagulate or agglomerate, and thus the regions become a passage through which the reaction gas flows.

Therefore, the porous body maintains constant moisture and simultaneously maintains a certain amount of pores, thereby facilitating smooth flow of the reaction gas.

The preferred embodiments of the present invention as described above are disclosed for exemplary purpose, where those skilled in the art having ordinary knowledge for the present invention can make various corrections, modifications and additions within idea and scope of the present invention, and such a correction, modification and addition should be considered as falling within the scope of the following claims.

INDUSTRIAL APPLICABILITY

According to the present invention, various structural and performant applications of the separator can be expanded by weaving metallic wires having different surface properties.

What is claimed is:
1. A metallic wire separator comprising:
   a plurality of first metallic wires, each of which comprising a hydrophilic surface; and
   a second metallic wire comprising a hydrophobic surface, wherein the plurality of first metallic wires and the second metallic wire each extend longitudinally in a first direction, the plurality of first metallic wires comprises a first metallic wire and a third metallic wire, the second metallic wire is intertwined with both the first metallic wire and the third metallic wire to alternately cross over the first metallic wire and the third metallic wire multiple times along the first direction, and the first metallic wire and the second metallic wire define a plurality of first pores, the second metallic wire and the third metallic wire define a plurality of second pores, and the plurality of first pores and the plurality of second pores are arranged alternately along the first direction.

2. The metallic wire separator according to claim 1, wherein the first metallic wire and the second metallic wire cross over each other by a uniform interval, and the second metallic wire and the third metallic wire cross over each other by the uniform interval.

3. The metallic wire separator according to claim 1, wherein the first metallic wire and the second metallic wire cross over each other by non-uniform intervals, and the second metallic wire and the third metallic wire cross over each other by non-uniform intervals.

4. The metallic wire separator according to claim 1, wherein the first metallic wire, the second metallic wire and the third metallic wire have the same diameter.

5. The metallic wire separator according to claim 1, wherein the first metallic wire and the second metallic wire have different diameters.

6. The metallic wire separator according to claim 1, wherein each of the first, second and third metallic wires has a diameter in a range of 50 to 500 μm.

7. The metallic wire separator according to claim 1, wherein the metallic wire separator is in the form of a metallic mesh.

8. The metallic wire separator according to claim 1, wherein the second metallic wire comprises a plurality of portions not crossed over by the first and third metallic wires, and the plurality of portions are aligned along and are spaced apart from each other in the first direction.

9. A fuel cell stack comprising:
a membrane-electrode assembly;
a gas diffusion layer on one side of the membrane-electrode assembly; and
a metallic wire separator contacting at least a portion of the gas diffusion layer,
wherein the metallic wire separator comprises:
a plurality of first metallic wires, each of which comprises a hydrophilic surface; and
a second metallic wire comprising a hydrophobic surface,
wherein the plurality of first metallic wires and the second metallic wire each extend longitudinally in a first direction,
the plurality of first metallic wires comprises a first metallic wire and a third metallic wire,
the second metallic wire is intertwined with both the first metallic wire and the third metallic wire to alternately cross over the first metallic wire and the third metallic wire multiple times along the first direction, and
the first metallic wire and the second metallic wire define a plurality of first pores, the second metallic wire and the third metallic wire define a plurality of second pores, and the plurality of first pores and the plurality of second pores are arranged alternately along the first direction.

10. The fuel cell stack according to claim 9, wherein the first metallic wire and the second metallic wire cross over each other by a uniform interval, and the second metallic wire and the third metallic wire cross over each other by the uniform interval.

11. The fuel cell stack according to claim 9, wherein the first metallic wire and the second metallic wire cross over each other by non-uniform intervals, and the second metallic wire and the third metallic wire cross over each other by non-uniform intervals.

12. The fuel cell stack according to claim 9, wherein the first metallic wire, the second metallic wire and the third metallic wire have the same diameter.

13. The fuel cell stack according to claim 9, wherein the first metallic wire and the second metallic wire have different diameters.

14. The fuel cell stack according to claim 9, wherein each of the first, second and third metallic wires has a diameter in a range of 50 to 500 μm.

15. The fuel cell stack according to claim 9, wherein the metallic wire separator is in the form of a metallic mesh.

16. The fuel cell stack according to claim 9, wherein the second metallic wire comprises a plurality of portions not crossed over by the first and third metallic wires, and the plurality of portions are aligned along and are spaced apart from each other in the first direction.

* * * * *